(12) United States Patent
Muthiah

(10) Patent No.: US 11,743,517 B2
(45) Date of Patent: Aug. 29, 2023

(54) GENERATING TRANSCODED MEDIA USING DATA STORAGE DEVICES

(71) Applicant: Western Digital Technologies, Inc., San Jose, CA (US)

(72) Inventor: Ramanathan Muthiah, Karnataka (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/533,523

(22) Filed: Nov. 23, 2021

(65) Prior Publication Data

US 2022/0182694 A1 Jun. 9, 2022

Related U.S. Application Data

(63) Continuation of application No. 16/917,458, filed on Jun. 30, 2020, now Pat. No. 11,184,650.

(51) Int. Cl.
*H04N 21/2343* (2011.01)
*H04N 21/647* (2011.01)
*H04N 21/658* (2011.01)
*H04N 21/218* (2011.01)

(52) U.S. Cl.
CPC .. *H04N 21/234309* (2013.01); *H04N 21/2181* (2013.01); *H04N 21/64738* (2013.01); *H04N 21/6582* (2013.01)

(58) Field of Classification Search
CPC ....... H04N 21/234309; H04N 21/2181; H04N 21/64738; H04N 21/6582; H04N 21/2343; H04N 21/23439; H04N 21/6581; H04N 21/6587
See application file for complete search history.

(56) References Cited

U.S. PATENT DOCUMENTS

| | | | | |
|---|---|---|---|---|
| 9,525,712 B1* | 12/2016 | Batra | | H04L 65/60 |
| 2002/0046404 A1* | 4/2002 | Mizutani | | G06F 3/00 |
| 2012/0147260 A1* | 1/2012 | Lee | | H04N 7/01 |
| 2016/0072868 A1* | 3/2016 | Poulin | | H04L 65/60 |

* cited by examiner

*Primary Examiner* — Anthony Bantamoi
(74) *Attorney, Agent, or Firm* — Chang & Hale LLP

(57) ABSTRACT

Devices and methods are disclosed that transcode a media file to generate a transcoded file that is based on a codec preference of a client device. The transcoded file can then be used to replace the media file or added as an additional stream to the media file. The transcoded file is transmitted to the client device. The client device can request the media file with a list of prioritized codecs so that the transcoded file is transcoded using a codec from the list based on the priority of the codec.

18 Claims, 5 Drawing Sheets

GENERATING TRANSCODED MEDIA USING DATA STORAGE DEVICES

CROSS-REFERENCE TO RELATED APPLICATIONS

This application is a continuation of U.S. patent application Ser. No. 16/917,458 filed Jun. 30, 2020 and entitled "AUTOMATIC TRANSCODING OF MEDIA DATA IN A DATA STORAGE DEVICE," which is incorporated by reference herein in its entirety for all purposes.

BACKGROUND

Field

This disclosure relates to data storage devices. More particularly, the disclosure relates to devices and methods for automatically transcoding media data in a data storage device.

Description of Related Art

Data storage devices provide access to data stored on the devices. The data can include media data such as audio and/or video files. A data storage device can receive a request from a client device for access to media data for viewing on the client device. In response, the data storage device can transfer the requested media data to the client device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
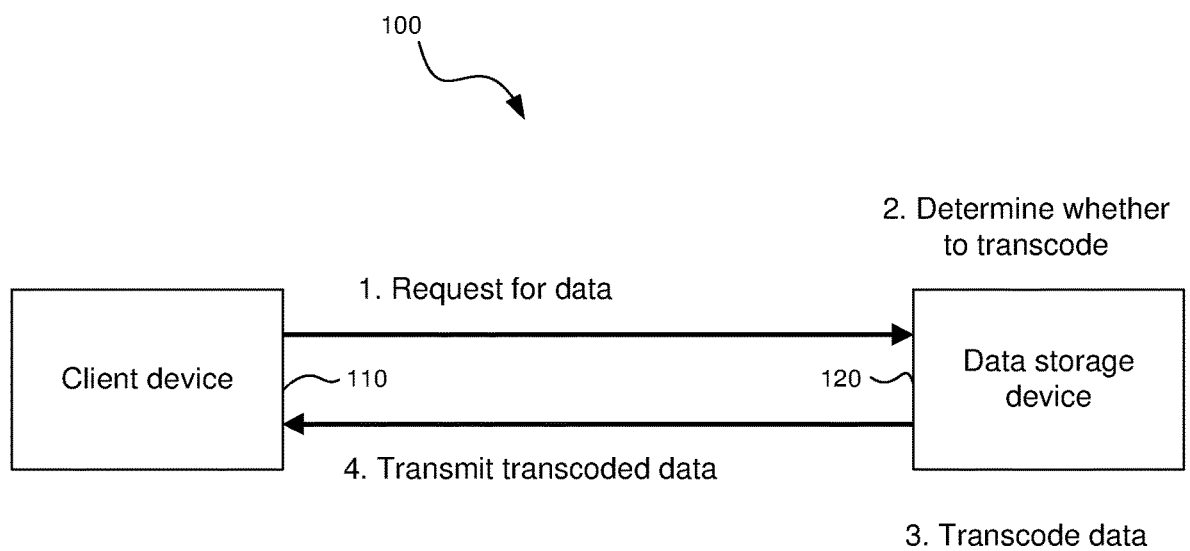
FIG. 1 illustrates a block diagram of an example system architecture with a client device configured to request a media file from a data storage device.

While certain embodiments are described, these embodiments are presented by way of example only, and are not intended to limit the scope of protection. Indeed, the novel methods and devices described herein may be embodied in a variety of other forms. Furthermore, various omissions, substitutions and changes in the form of the methods and devices described herein may be made without departing from the scope of protection.

Overview

A relatively large portion of network bandwidth and data storage is occupied by media files, such as video and audio. Typically, a user stores media files on a device or server with relatively high data storage capacity, such as a network attached storage (NAS) device. The user then may try to access the media files using a device different from the storage device, such as a laptop, tablet, mobile device, desktop personal computer, etc. Different machines accessing the data storage device may have different decode capabilities for audio and video. Consequently, the data stored in the data storage device may be consumable by one client but not by another client in the same form. Because most storage devices are passive devices, if a media file is incompatible with a particular client device the user may be unable to consume that media. Accordingly, there is a need for data storage devices that can provide media files that are compatible with a requesting client device.

Disclosed herein are devices and methods that address these and other related issues. The disclosed devices and methods are configured to receive a request from a client device for a media file, determine compatibility of the media file with the requesting client device, and, if appropriate, transcode the media file into a compatible form which is then transmitted to the requesting client device. To determine whether a media file is compatible with the client request, the storage device can analyze a portion of the requested media file and compare that information with parameters of the client request. The client request, in some instances, includes a priority list of codecs for transcoding. The client request, in certain instances, includes a client-specified bandwidth. Transcoded data can be stored alongside the original file as a new file, stored in place of the original file, or stored in the same container as the original file so that the new file includes both the original version and the transcoded version of the media file.

The client request can include a variety of relevant parameters that the storage device can use to determine compatibility of the requested media file. Examples of parameters include, for example and without limitation, bit rate, frame rate, resolution, video codec, audio codec, etc. Upon determining that the existing codecs, bit rate, frame rate, or other media parameter is not consistent with the client request, the storage device can transcode the data. Transcoding involves dynamically decoding of audio and video streams followed by re-encoding the data in storage, in accordance with the storage client's request.

The disclosed devices and methods provide a number of advantages. For implementations where the data storage device has a network connection, updating transcoding capabilities on the data storage device can be relatively straightforward. For example, certain audio and/or video codec's have hardware accelerator requirements. In such instances, new codecs may be supported by updating the firmware of the data storage device over the network. Firmware binaries can be sent to the data storage device over the network when a new codec is to be supported and/or evolves. Another advantage is that the data storage device can provide media files to a variety of client devices with differing playback capabilities. For example, a single media file can be transcoded using different transcoding parameters so that that single media file is usable by different client devices. The transcoding can be done automatically and dynamically in response to client requests. In some embodiments, the data storage device can keep transcoded files so that the media file does not need to be dynamically transcoded each time the client device requests the media file. As another example, transcoding media files using the storage device may be advantageous relative to transcoding media files using a client device because it reduces data transfers from the storage device.

As used herein, transcoding includes taking compressed or encoded content, decompressing or decoding it, optionally altering the content, and re-compressing or reencoding the content. Transcoding can also include changing bit rates of the media file. This may be done without changing the video and/or audio codec. Transcoding can also include resizing the video frame or changing the resolution of the video file. This may be done without changing the video and/or audio codec. Transcoding can also include changing the frame rate of the media file. This may be done without changing the video and/or audio codec.

The data storage devices disclosed herein include any suitable storage device such as network-attached storage (NAS) devices. NAS is typically a file-level computer data-storage server connected to a computer network providing data access to a heterogeneous group of clients. NAS is typically designed as a self-contained solution for sharing files over a network. NAS is typically configured to serve files to a variety of different clients using different applications to access the data.

Auto-Transcoding Data Storage Devices

FIG. 1 illustrates a block diagram of an example system architecture 100 with a client device 110 configured to request a media file from a data storage device 120. The client device 110 can be any suitable client device, examples of which are described herein. Similarly, the data storage device 120 can be any suitable storage device, examples of which are described herein.

First, the client device 110 is configured to request a media file from the data storage device 120. Second, the data storage device 120 determines whether it is suitable, appropriate, or necessary to transcode the requested media file. Third, responsive to determining that transcoding is appropriate or necessary, the data storage device 120 transcodes the media file. Fourth, the data storage device 120 transmits the transcoded data to the requesting client device 110. In instances where transcoding is not appropriate or necessary, the requested media file can be transmitted to the client device 110 without transcoding. In instances where transcoding is not feasible or possible, a notification can be provided from the data storage device 120 indicating that transcoding will not be performed. In such instances, the original media file can optionally be transmitted to the client device 110. This allows the client device 110 to potentially transcode the media file itself.

Referring to the first step in FIG. 1, the client request can include a variety of parameters that the data storage device 120 can use to determine compatibility of the requested media file with the client device 110. The client request can include parameters such as, for example and without limitation, frame rate, resolution, bit rate, video codec, audio codec, and the like. In some embodiments, the client request includes client-specified or client-determined bandwidth. In certain embodiments, the client request includes a prioritized list of codecs from the client 110.

In some embodiments, the client request can include a hardcoded requirement for transcoding. The hardcoded requirement indicates that the data storage device 120 is required to transcode the media file if it does not match the parameters in the client request. If this is not feasible or possible, the data storage device 120 can notify the client device 110 that transcoding is not feasible or possible. In some embodiments, the client request can include a soft coded requirement for transcoding. The soft coded requirement indicates that the data storage device 120 can decide whether to transcode or not. The decision by the data storage device 120 depends at least in part on an analysis of the parameters in the client request.

In some implementations, the request from the client device 110 can conform to a suitable specification. For example, NVM EXPRESS™ or NVMe™ is a specification that defines communication protocols between applications and non-volatile memory. The specification allows for customized commands. The client device 110 can utilize these customized commands to enable inclusion of the disclosed parameters in the request to the data storage device 120. The data storage device 120 can be configured to parse these customized commands to extract client parameters from the request.

Referring to the second step in FIG. 1, the data storage device 120 is configured to determine whether or not to transcode the requested media file. To do so, the data storage device 120 determines whether the client parameters in the client request are compatible with the requested media file. If the parameters are incompatible with the requested media file, the data storage device 120 is configured to determine appropriate transcoding parameters that are compatible with the client request.

In some embodiments, the data storage device 120 is configured to parse the header of the media file to determine whether the parameters of the media file are compatible with the client request. If compatible, the data storage device 120 can transmit the requested media file to the client device 110. If incompatible, the data storage device 120 can determine transcode parameters that would result in the media file being compatible with the client request.

In certain instances, the data storage device 120 may not be able to transcode the media file in a way to make it compatible with the requesting client device 110. In such instances, the data storage device 120 is configured to notify the client device 110 that transcoding is not feasible or possible. The data storage device 120 may, in such instances, transmit the original media file without transcoding or it may transcode the media file so that it has parameters approximately compatible with the client request.

In some embodiments, the client request includes a priority list of audio and/or video codecs. In certain implementations, the priority list of codecs is provided in addition to or as an alternative to the other parameters of the client request described above. The data storage device 120 is configured to select a codec from the priority list and to use the selected codec for transcoding. In selecting the codec from the priority list, the data storage device 120 can be configured to consider its own processing bandwidth, storage bandwidth, and resources. This can be done to enable timely delivery of the requested media data. For example, the data storage device 120 is configured to analyze its current computing workload and/or storage workload to determine a codec for transcoding based on that analysis. If a significant portion of the processing capacity of the data storage device 120 is occupied with other processing jobs, a codec can be selected that is less processor intensive. Similarly, if the data storage device 120 is performing storage intensive jobs, a codec can be selected that is less demanding with respect to data storage.

Other considerations in selecting a codec from the priority list include licensing. Some codecs require licensing to use. Thus, the data storage device 120 can select a codec from the list to which it has a license.

The priority list can rank the codecs in the list. As an example, the codecs can be provided in a ranked list where the first codec is the first priority, the second codec is the second priority, and so on. As another example, the codecs can be grouped into priority groups with a first group being a preferred group, a second group being a desirable group, a third group being an acceptable group, and so on. In certain implementations, if a codec is not included in the priority list then the data storage device 120 is configured to exclude that codec from potential transcoding codecs.

In some embodiments, the requested media data is transcoded based on client-determined network bandwidth. For example, if the requested media file is rich (e.g., it has a relatively high bit rate and high frame rate), transferring that media file may choke the network, resulting in buffering issues. The data storage device 120 can be configured to determine to transcode to reduce or eliminate buffering issues. This may result in transcoding where it otherwise would not be performed.

Referring to the third step in FIG. 1, the data storage device 120 is configured to transcode the media file based on the determination made in the second step. The transcoded file can be used as a replacement for the original media file, can be kept alongside the original media file, or it can be inserted into the original media file as an additional stream. In some embodiments, the transcoded file is kept temporarily while streaming or transmitting to the client device 110. Upon termination of streaming or transmitting, the data storage device 120 removes the transcoded file from storage. A host configuration file can be used to determine how the transcoded file is handled.

As an example, certain embodiments insert the transcoded data along with the original or source file into the same Moving Picture Experts Group (MPEG) stream. The MPEG format organizes audio and video streams of a media file as separate programs or entities with a clock module that enables synchronization of audio and video. Where the transcoded data is inserted into the original file, the new audio and/or video streams can be added to the media file as new streams. The MPEG can have 4 audio and 4 video programs meaning that 8 programs can coexist in the media stream. If there is room, the transcoded audio and/or video can be added to the media stream. This enables the client device 110 to play the media file because the media file now has compatible stream(s) in the file, the compatible stream(s) transcoded by the data storage device 120. Other embodiments remove the original stream(s), replacing them with the transcoded stream(s). These processes can be driven by a host configuration file.

In some embodiments, transcoding is done to achieve a resultant new codec. In certain embodiments, transcoding is done to achieve a targeted bit rate and/or frame rate. In various embodiments, transcoding is done to achieve a combination of a new codec, a new bit rate, and a new frame rate.

Referring to the fourth step in FIG. 1, the data storage device 120 transmits the transcoded data to the client device 110. In some embodiments, the transcoded file along with the original media file can be transmitted to the client device 110. In certain implementations, the data storage device 120 is configured to notify the client device 110 when transcoding is not feasible or not possible. In such implementations, the data storage device 120 can be configured to provide the requested media file without transcoding.

Figure 2:
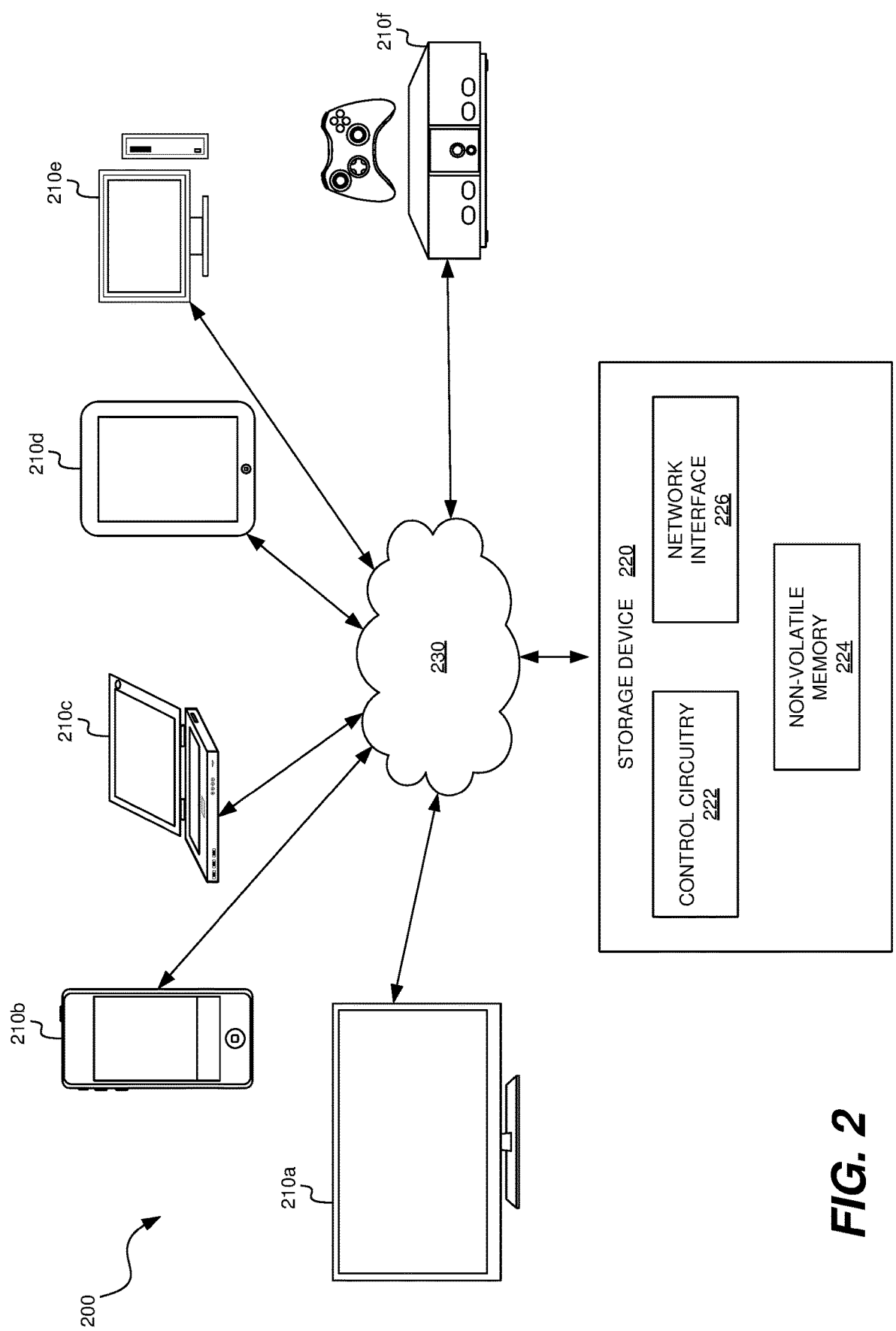
FIG. 2 illustrates a block diagram of an example system architecture that includes a storage device that hosts one or more media files.

FIG. 2 illustrates a block diagram of an example system architecture 200 that includes a storage device 220 that hosts one or more media files. The storage device 220 is communicatively coupled to one or more client devices 210a-210f. The storage device 220 is configured to receive requests over a network 230 from individual client devices for media files stored on the storage device 220. In response to the requests, the storage device 220 is configured to determine whether to transcode the requested media file. The decision whether to transcode the media file is based on an analysis of parameters included in the client request. The storage device 220 is configured to deliver the transcoded file over the network 230 to the requesting client device.

The storage device 220 includes control circuitry 222, non-volatile memory 224, and a network interface 226. The control circuitry 222 of the storage device 220 can include one or more general-purpose processing devices such as a microprocessor, central processing unit, or the like one. More particularly, the control circuitry 222 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The control circuitry 222 may also be one or more special-purpose processing devices such as an application specific integrated circuit (ASIC), a field programmable gate array (FPGA), a digital signal processor (DSP), network processor, or the like. The control circuitry 222 may be configured to execute certain software applications, drivers, or firmware for implementing the functionality described herein.

The storage device 220 may store data and/or data objects on the non-volatile memory 224 that may be accessed by the client devices 210a-210f. The storage device 220 can utilize various types of non-volatile memory 224 such as a HDD, NAND memory (e.g. SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. The non-volatile memory 224 can also utilize magnetic media (e.g., magnetic discs, shingled magnetic recording (SMR) media/discs, etc.). New types of emerging non-volatile memory could also be used such as Program in Place or Storage Class Memory (SCM) such as ReRam, PCM, and MRAM.

While certain embodiments are described herein, it should be understood that different types of storage devices and RAM technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

The types of client devices that may access the storage device 220 can include smart TV's 210a, phones 210b, such as smartphones, laptop computers 210c, tablet computers 210d, desktop computers 210e, video game consoles 210f, wearable computers (not shown) and/or other network-connected computing devices. The network 230 may be a local area network (LAN), a wide area network (WAN) (e.g., the Internet), or other type of computer network, and the connections between the various client components of the architecture 200 and the network 230 may be either wired or wireless. The storage device 220 includes the network interface 226 (e.g., a network interface card, a Wi-Fi interface, etc.) to enable communication over the network 230 to the client devices 210a-210f.

A user can access and play a media file on a client computing device 210a-210f using a media player. For example, a client computing device 210a-210f can send a request to the storage device 220 for the media file and the storage device 220 can retrieve the media file from non-volatile memory 224. The media file can be transcoded and provided to the client device 210a-210f, for example, for streaming.

The storage device 220 is configured to execute instructions (e.g., stored on the non-volatile memory 224) that cause the storage device 220 to perform any one or more of the methodologies (e.g., operations, methods, functions, etc.) disclosed herein (e.g., using the control circuitry 222). The storage device 220 may be embodied in any suitable device including network attached storage devices, a server, a router, a general personal computer, a laptop, a tablet, etc., within which a set of instructions, for causing the machine to perform any one or more of the methodologies disclosed herein, may be executed. The storage device 220 may operate in the capacity of a server machine in a client-server network environment.

Thus, the storage device 220 stores media files and firmware supporting a variety of codecs on the non-volatile memory 224. The storage device 220 uses the network interface 226 to receive client requests and to transmit requested media data. The control circuitry 222 controls operation of the network interface 226 and the non-volatile memory 224. Computer executable instructions are stored on the non-volatile memory 224. The control circuitry 222 is configured to execute these instructions to determine whether to transcode a media file based on an analysis of compatibility between the requested media file and parameters included in the client request, as described in greater detail herein. The control circuitry 222 is further configured to determine whether and how to store the transcoded media file, as described in greater detail herein.

Figure 3:
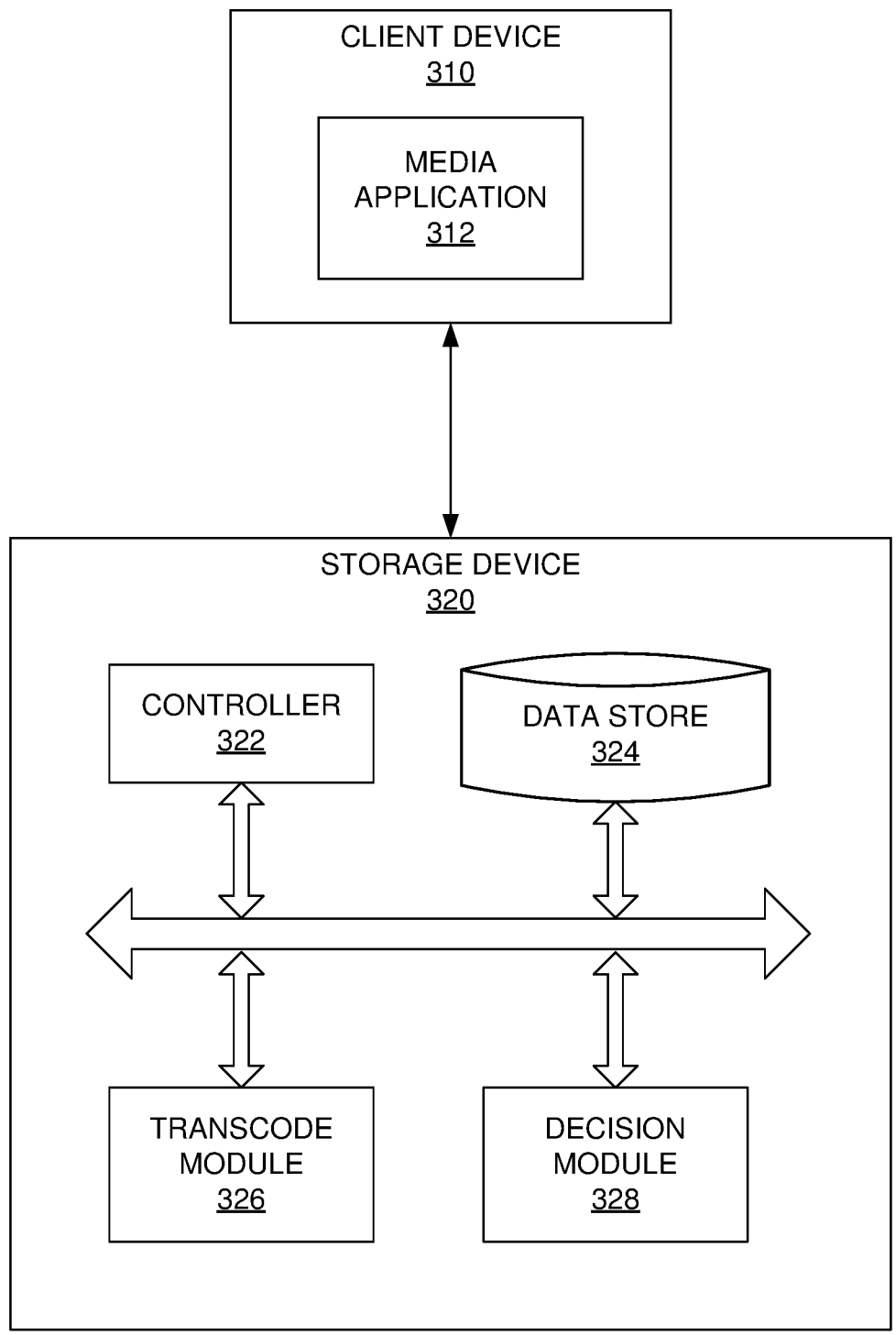
FIG. 3 illustrates a block diagram of an example storage device configured to automatically transcode media files based at least in part on a request for the media file from a client device.

FIG. 3 illustrates a block diagram of an example storage device 320 configured to automatically transcode media files based at least in part on a request for the media file from a client device 310. The storage device 320 includes a controller 322, a data store 324, a transcode module 326, and a decision module 328. The client device 310 includes a media application 312 that is configured to request and present media files.

The controller 322 is configured to control operation of the data store 324, the transcode module 326, and the decision module 328. The controller 322 can be implemented using the control circuitry described herein with reference to FIG. 2.

The data store 324 can be configured to store files using object-oriented storage, flat file storage or hierarchical file storage. The data store 324 can include a database or other suitable structured set of data. The data store 324 is configured to store the media files requested by the client device 310. The data store 324 can be implemented using any combination of non-volatile and volatile memory, as described herein with reference to FIG. 2.

The transcode module 326 is configured to control transcoding of media files. The transcode module 326 can be implemented using any suitable combination of software, firmware, and hardware. The transcode module 326 can access audio and video codecs to decode and re-encode media files. The transcode module 326 can alter the bit rate, frame rate, and or resolution of the media file. The transcode module 326 can be configured to modify a media file to make it compatible with parameters specified by the client device 310. These parameters can include, for example and without limitation, the specified audio codec, a specified video codec, a list of audio codecs, a list of video codecs, a targeted bit rate, a range of acceptable bit rates, a maximum bit rate, a minimum bit rate, a targeted frame rate, a range of acceptable frame rates, a maximum frame rate, a minimum frame rate, a targeted resolution, a range of acceptable resolutions, a minimum resolution, a maximum resolution, or any combination of these. The parameters may also include a prioritized list of audio codecs and/or video codecs. The parameters may also include client-specified bandwidth. The parameters may also include a hardcoded or softcoded transcode indicator.

The decision module 328 is configured to analyze parameters received from the client device 310 and to determine whether the requested media file is compatible with the received parameters. The decision module 328 can be implemented using any suitable combination of software, firmware, and hardware. To determine compatibility, the decision module 328 can analyze a portion of the media file, such as the header of the media file, to extract relevant information such as the bit rate, the frame rate, the resolution, the audio codec, or the video codec of the media file.

In some embodiments, the decision module 328 analyzes a priority list received from the client device 310. The decision module 328 determines from the priority list which codec to use to transcode the requested media file. The decision module 328 is configured to analyze the resources of the storage device 320 in determining the appropriate codec from the priority list.

In some embodiments, the decision module 328 determines suitable transcode parameters based at least in part on client-specified bandwidth. The suitable transcode parameters can be parameters that reduce or eliminate buffering issues. For example, if the decision module 328 determines that the media file requires more bandwidth than is specified by the client device 310, the decision module 328 can interact with the transcode module 326 to transcode the media file to reduce the bit rate, frame rate, and/or resolution or to change the codec so that transferring the transcoded media file does not exceed the bandwidth specified by the client device 310.

The client device 310 includes a media application 312 that is configured to present a media file to a user. The media application 312 may be restrained by the hardware, firmware, and/or software of the client device 310 so that it is not compatible with certain media files. The media application 312 can request media files from the storage device 320 and with that request can include parameters to ensure that the media file delivered by the storage device 320 is compatible with the media application 312 and the client device 310. The media application 312 can specify compatible bit rates, frame rates, resolutions, and/or codecs. The media application 312 can specify a prioritized list of codecs. The media application 312 can specify a targeted bandwidth to not exceed when transferring the media file. These parameters can be used by the storage device 320 to determine whether to automatically transcode the media file requested by the client device 310 through the media application 312.

In certain implementations, the storage device 320 is configured to determine compatibility of the media file based at least in part on the parameters included in the client request. In some instances, the parameters of the client request do not include a specific codec or a list of preferred codecs. Rather, the parameters of the client request include information regarding bit rate, frame rate, and/or resolution. In such implementations, the storage device 320 is configured to determine appropriate transcoding parameters which may or may not include changing the codec of the media file.

In some implementations, the storage device 320 is configured to determine compatibility of requested media file based at least in part on the bandwidth specified by the client in the request. The bandwidth may be provided by the client device 310 in addition to or as an alternative to the other parameters described herein (e.g., bit rate, frame rate, resolution, codec, etc.).

In various implementations, the storage device 320 is configured to determine a codec to use based on a priority list received from the client device 310. In some instances, the client request includes additional parameters such as bit rate, frame rate, or resolution. In certain instances, the client request does not include these additional parameters. The storage device 320 is configured to select a codec from the list based at least in part on computing and storage resources available to the storage device 320.

In certain implementations, the storage device 320 generates a transcoded file for transmitting to the client device 310. The transcoded file can be stored alongside the original media file, can replace the original media file, or can be added to the original media file, as described in greater detail herein. The decision to generate the transcoded file by the decision module 328 can utilize any of the analyses described herein.

Auto-Transcoding Methods

Figure 4:
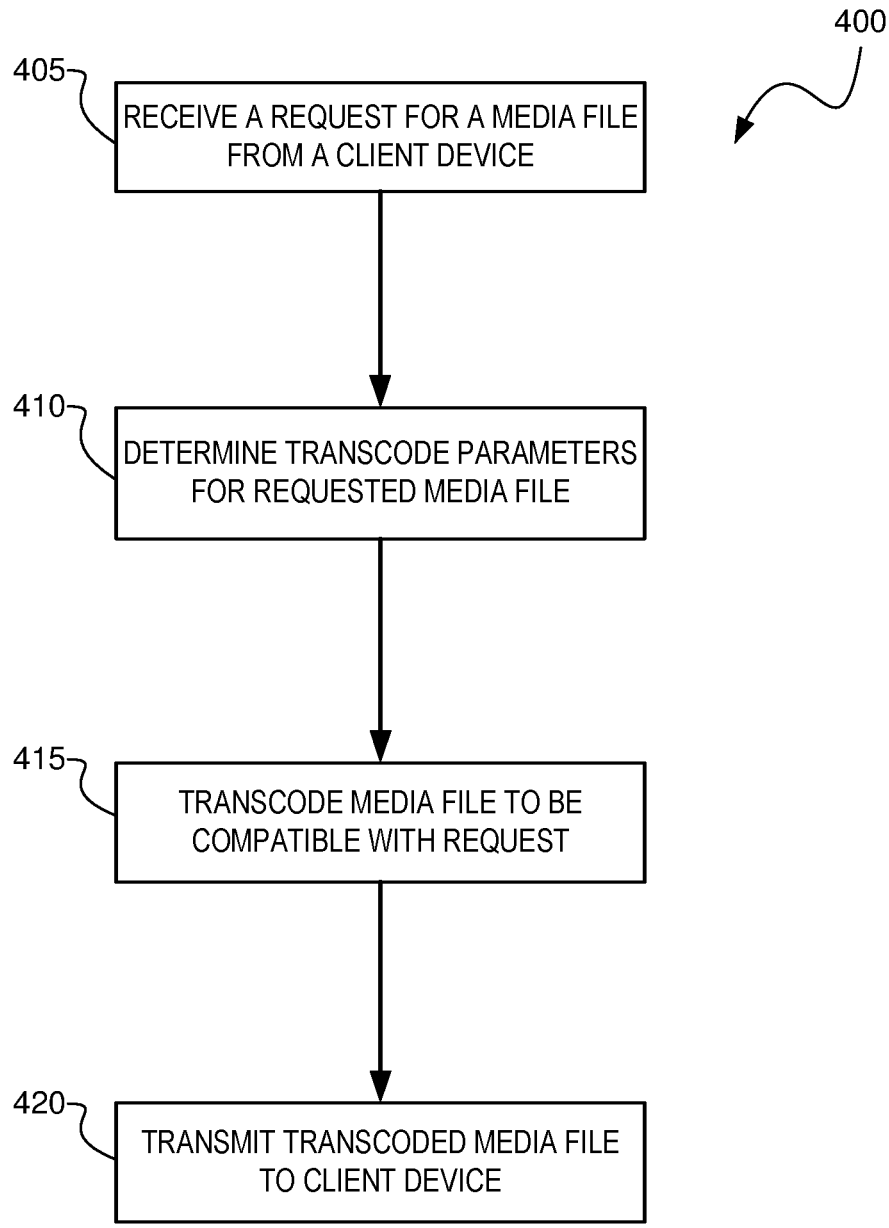
FIG. 4 illustrates a workflow process for transcoding a media file based on a request from a client device.

FIG. 4 illustrates a workflow process 400 for transcoding a media file based on a request from a client device. For example, the workflow process 400 may be performed by a controller of a storage device, such as the storage device 120, 220, 320. For illustrative purposes, the process 400 is explained below in connection with the storage device 220. Certain details relating to the process 400 are explained in more detail with respect to FIGS. 1-3. Depending on the embodiment, the process 400 may include fewer or additional blocks, and the blocks may be performed in an order that is different from illustrated.

At block 405, the storage device receives a request for media data from a client device. The request can include parameters associated with the client device. The parameters can be used to indicate capabilities of the client device to ensure that the media file received in response is compatible with the client device. In some embodiments, the parameters can be used to indicate a bandwidth specified by the client and/or a priority list of codecs specified by the client.

At block 410, the storage device determines whether to transcode the media file based on the received request. An example process for determining whether to transcode is described herein with reference to FIG. 5. Other example processes for making this determination are provided elsewhere herein. For example, the storage device can compare properties of the media file with parameters in the request to determine if they are compatible. If they are not compatible, the storage device can decide to transcode the media file. As another example, the storage device can receive a hardcoded request for transcoding the media file. In response, the storage device is configured to transcode the media file based on parameters in the hardcoded request. As another example, the storage device can receive a priority list of codecs. In response, the storage device is configured to select a suitable codec from the list. As another example, the storage device can receive a client specified bandwidth. In response, the storage device is configured to determine whether the media file would exceed the specified bandwidth and, if so, to transcode the media file to reduce or eliminate the possibility that the transcoded media file would exceed the specified bandwidth.

At block 415, the storage device transcodes the media file to be compatible with the client request. In some embodiments, the storage device is configured to determine suitable transcode parameters that result in a file compatible with the requesting client device. In certain embodiments, the storage device is configured to select a codec that is provided by the client. This may be provided as a parameter in the client request or as a list of preferred codecs received from the client. The storage device thus alters the original media file to generate a transcoded media file suitable for the client device.

In certain implementations, the storage device does not determine a suitable codec or does not determine suitable transcode parameters. In such instances, the storage device can be configured to transmit the original media file without transcoding to the client device. The storage device can be configured to transmit a message to that client device that no suitable transcode parameters were determined by the storage device. This can be done as an alternative or in addition to transmitting the original media file.

In some embodiments, the transcoded file can be used to replace the original media file. In certain embodiments, the transcoded file can be stored alongside the original media file. In various embodiments, the transcoded file can be added to the original media file. At block 420, the storage device transmits the transcoded file to the client device.

Figure 5:
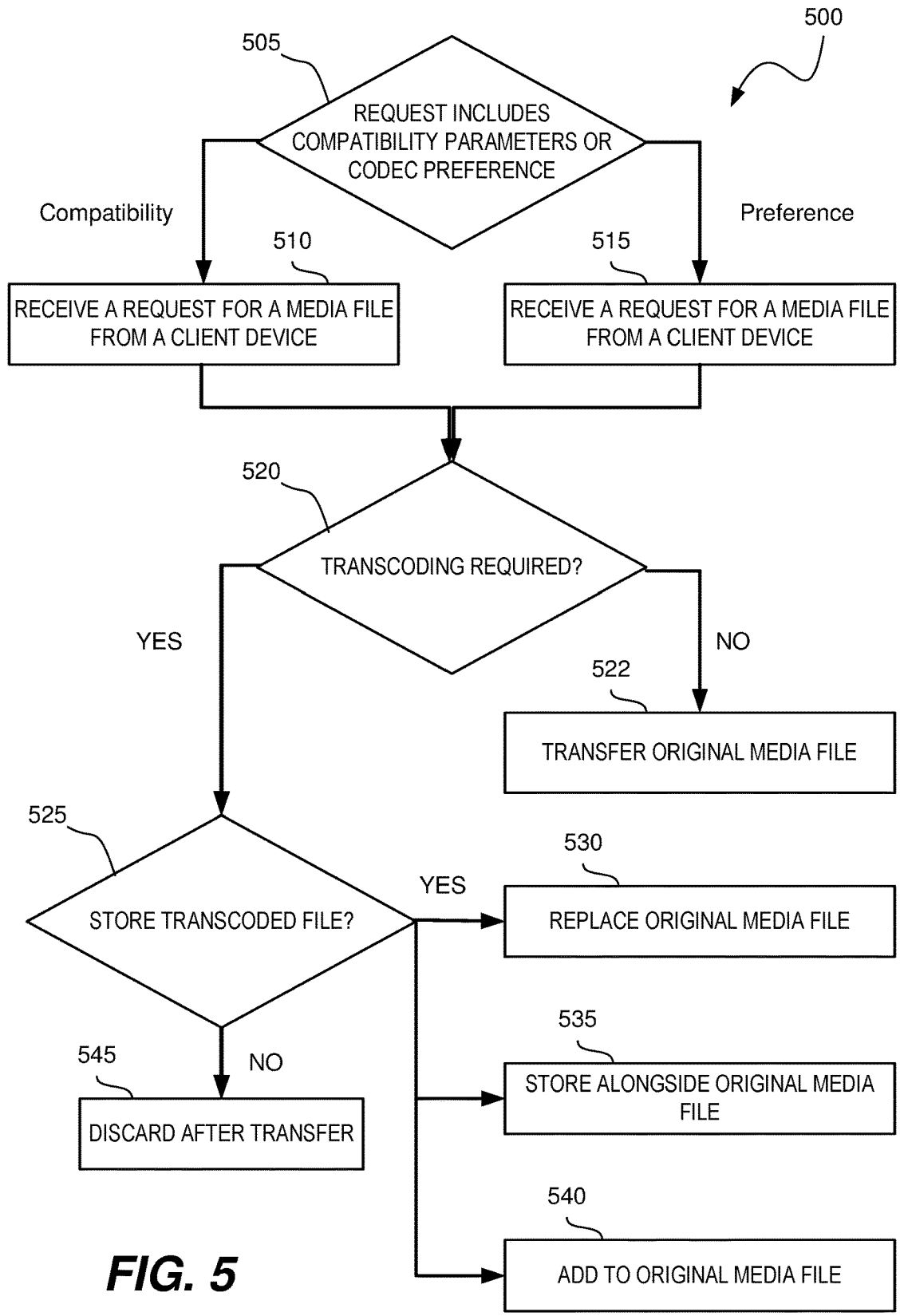
FIG. 5 illustrates a workflow process for determining whether to transcode a media file

FIG. 5 illustrates a workflow process 500 for determining whether to transcode a media file. For example, the workflow process 500 may be performed by a controller of a storage device, such as the storage device 120, 220, 320, or a decision module of the storage device, such as the decision module 328 of the storage device 320. For illustrative purposes, the process 500 is explained below in connection with the storage device 320. Certain details relating to the process 500 are explained in more detail with respect to FIGS. 1-3. Depending on the embodiment, the process 500 may include fewer or additional blocks, and the blocks may be performed in an order that is different from illustrated.

At block 505, the storage device determines whether the client request for a media file specifies compatibility parameters or codec preferences. At block 510, responsive to determining that the request includes compatibility parameters, the storage device analyzes the media file for compatibility. Compatibility can mean that the media file has a bit rate (or range of bit rates) that is in a range specified by the client parameters. Compatibility can mean that the media file has a frame rate (or range of frame rates) that is in a range specified by the client parameters. Compatibility can mean that the media file has a resolution (or range of resolutions) that is in a range specified by the client parameters. Compatibility can mean that any combination of the bit rate, the frame rate, and the resolution is within a range specified by the client. In some embodiments, the client specifies minimums, maximums, and/or ranges for the bit rate, the frame rate, and/or resolution.

At block 515, responsive to determining that the request includes codec preferences, the storage device determines if it is capable of transcoding the media file using one or more of the specified codecs in the codec preferences. In some embodiments, the codec preferences include a single codec rather than a list of codecs. In such embodiments, the storage device is configured to determine whether it is capable of transcoding the media file using the specified codec. In some embodiments, the codec preferences include a prioritized list of codecs. In such embodiments, the storage device is configured to select from the prioritized list a codec. The selection can be based on resources available to the storage device.

At block 520, the storage device determines the necessity of generating a transcoded file based on the results of the analysis at block 510 or at block 515. If, for example, the media file is compatible with the parameters in the client request, then the storage device is configured to not transcode the file. As another example, if the media file includes an audio and video codec from the list of preferred codecs than the storage device is configured to not transcode the file. In such instances, the storage device transfers the original media file at block 522. Otherwise, the storage device is configured to transcode the media file based on the parameters determined at block 510 and at block 515.

At block 525, the storage device determines what to do with the transcoded file. The storage device can be configured to replace the original media file with the transcoded file at block 530. The storage device can be configured to store the transcoded file alongside the original media file at block 535. The storage device can be configured to add the transcoded data to the original media data in a single file at block 540. The storage device can be configured to discard the transcoded data after transferring to the client device at block 545.

Additional Embodiments

Those skilled in the art will appreciate that in some embodiments, other types of storage devices configured to automatically transcode media files can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method for automatically transcoding a media file, the method comprising:
   determining that transcoding of the media file is required due, at least in part, to the media file being incompatible with a codec preference in a request for the media file;
   transcoding the media file to generate a transcoded file having a codec compatible with the codec preference;
   transmitting the transcoded file to a client device;
   determining whether to store or discard the transcoded file;
   responsive to determining that the transcoded file is to be stored, replacing the media file with the transcoded file or adding the transcoded file to the media file as an additional stream of the media file; and
   responsive to determining that the transcoded file is to be discarded, discarding the transcoded file after transmitting the transcoded file to the client device while retaining an original version of the media file.

2. The method of claim 1, wherein the codec preference comprises a list of codecs.

3. The method of claim 2, wherein the list of codecs is ordered according to a priority of each codec in the list of codecs.

4. The method of claim 2, further comprising selecting a codec from the list of codecs based, at least in part, on available computing resources.

5. The method of claim 4, wherein the available computing resources comprises storage resources.

6. The method of claim 1, wherein the request further comprises at least one of a bit rate, a frame rate, and a resolution for the media file.

7. The method of claim 1, wherein determining that transcoding of the media file is required is further based, at least in part, on compatibility with parameters in the request, the parameters associated with a codec, a bit rate, a frame rate, or a resolution of the media file.

8. The method of claim 7, wherein the transcoded file is compatible with the parameters in the request.

9. A storage device comprising:
   non-volatile memory configured to store a media file;
   a network interface configured to communicate with a client device over a network; and
   control circuitry coupled to the non-volatile memory and the network interface, the control circuitry configured to:
      determine that transcoding of the media file is required due, at least in part, to the media file being incompatible with a codec preference in a request for the media file;
      transcode the media file to generate a transcoded file having a codec compatible with the codec preference;
      transmit the transcoded file to the client device;
      determine whether to store or discard the transcoded file;
      responsive to determining that the transcoded file is to be stored in the non-volatile memory, replace the media file with the transcoded file or add the transcoded file to the media file as an additional stream of the media file; and
      responsive to determining that the transcoded file is to be discarded, discard the transcoded file after transmitting the transcoded file to the client device while retaining an original version of the media file.

10. The storage device of claim 9, wherein the codec preference comprises a list of codecs.

11. The storage device of claim 10, wherein the list of codecs is ordered according to a priority of each codec in the list of codecs.

12. The storage device of claim 10, wherein the control circuitry is further configured to select a codec from the list of codecs based, at least in part, on available computing resources.

13. The storage device of claim 12, wherein the available computing resources comprise storage resources.

14. The storage device of claim 9, wherein the request further comprises at least one of a bit rate, a frame rate, and a resolution for the media file.

15. The storage device of claim 9, wherein determining that transcoding of the media file is required is further based, at least in part, on compatibility with parameters in the request, the parameters associated with a codec, a bit rate, a frame rate, or a resolution of the media file.

16. The storage device of claim 15, wherein the transcoded file is compatible with the parameters in the request.

17. A storage device comprising:
means for storing a media file;
means for communicating with a client device over a network; and
control circuitry means configured to:
  determine that transcoding of the media file is required due, at least in part, to the media file being incompatible with a codec preference in a request for the media file;
  transcode the media file to generate a transcoded file having a codec compatible with the codec preference;
  transmit the transcoded file to the client device;
  determine whether to store or discard the transcoded file;
  responsive to determining that the transcoded file is to be stored in the means for storing the media file, replace the media file with the transcoded file or add the transcoded file to the media file as an additional stream of the media file; and
  responsive to determining that the transcoded file is to be discarded, discard the transcoded file after transmitting the transcoded file to the client device while retaining an original version of the media file.

18. The storage device of claim 17, wherein the codec preference comprises a prioritized list of codecs.

* * * * *